United States Patent Office 3,284,406

Patented Nov. 8, 1966

3,284,406

ORGANOSILOXANE ENCAPSULATING RESINS

Melvin E. Nelson, Midland, Mich., assignor to Dow Corning Corporation, Midland, Mich., a corporation of Michigan No Drawing. Filed Dec. 18, 1963, Ser. No. 331,384
14 Claims. (Cl. 260—46.5)

This application is a continuation-in-part of application Serial No. 94,142, filed March 8, 1961, and now abandoned.

This invention relates to transparent flexible organosiloxane casting resins.

Because of their superior thermal stability and electrical properties organopolysiloxanes have long been used to insulate electrical and electronic equipment. When the insulation is in the form of relatively thin films any siloxane resin system can be satisfactorily employed. However, when the insulation is to be used in deep section many siloxane resins are unsuitable. One reason for this is the fact that many siloxane resin systems require a solvent carrier and/or evolve volatiles when they are cured. In both cases the removal of the volatile (either solvent or reaction by-product) precludes cure in deep section since the formation of voids in the cured resin renders electrical properties of the resulting component unsatisfactory. This deficiency cannot be cured by vacuum impregnation since the voids are formed after the viscosity of the resin has reached a point where the volatile material can no longer escape.

There are other siloxane systems which can be cured without the formation of volatiles, but which require the presence of atmospheric moisture. Whereas, these systems do not form voids when cured in deep section, the cure thereof is extremely slow or incomplete due to the fact that atmospheric moisture cannot penetrate into the middle of the resin mass.

Another problem which has long plagued the siloxane encapsulation art has been the high coefficient of expansion exhibited by organosiloxanes. It is 10 to 20 times that of metals normally employed in electrical and electronic equipment. As a result, tremendous stresses are set up in the insulation when the encapsulated system is alternately heated and cooled. Consequently, heretofore employed siloxane encapsulating resins were often unsatisfactory because the thermal cycling caused cracking of the insulation. This cracking could of course be avoided by employing known siloxane elastomers.

However, presently known unfilled siloxane elastomers have an extremely low mechanical strength. That is the tensile strength of an unfilled vulcanized dimethylpolysiloxane is in the order of 50 p.s.i. Consequently, such materials do not have the mechanical strength required for many electrical applications. The mechanical strength of siloxane elastomers can be improved by employing fillers. However, such fillers render the mass either opaque or opalescent. Thus, the electrical components cannot be seen through the insulating mass.

This is a matter of great importance since in many electric systems the individual components are quite cheap, often less than one dollar, whereas, the finished system may be worth thousands of dollars. However, when the material has been encapsulated in an opaque insulating material and one of the cheap components fails, there is often no way of determining which one has failed. Consequently, the entire system is often discarded.

It is the object of this invention to provide a transparent encapsulating material which has the required mechanical strength and flexibility to give satisfactory service over a wide range of temperature conditions and under severe mechanical stresses. Another object is to provide a material through which the individual components of an electric system can be seen and which will allow replacement of such components without ruining the insulation of the entire system. Other objects and advantages will be apparent from the following description.

This invention relates to a mixture consisting essentially of (1) a polysiloxane of the formula $$R_2ViSiO\left(\begin{matrix}R'_2\\|\\SiO\end{matrix}\right)_nSiR_2Vi$$

in which R and R′ are phenyl or methyl and at least 80 mol percent of the R′ groups are methyl, said siloxane (1) having a viscosity of from 500 to 500,000 cs. inclusive at 25° C., (2) from 5 to 50 percent by weight based on the weight of (1) and (2) of a copolymer of $SiO_2$, $Me_3SiO_{.5}$ and $Me_2ViSiO_{.5}$ siloxane units in which copolymer there is from 1.5 to 3.5 percent by weight vinyl groups based on the weight of (2) and in which copolymer (2) the ratio of total $Me_3SiO_{.5}$ and $Me_2ViSiO_{.5}$ to $SiO_2$ units is from .6:1 to 1:1, (3) a compound compatible with (1) and (2) which is a siloxane containing from 0.1 to 1.7 percent by weight silicon-bonded hydrogen atoms, the remaining valences of the silicon atoms in (3) being satisfied by phenyl or methyl radicals, there being at least three silicon-bonded hydrogen atoms per molecule, and in (3) any hydrocarbon radicals attached to an SiH silicon being essentially all methyl radicals, the amount of (3) being such that there is from .75 mol of SiH per mol of vinyl radicals in (1) and (2) to 1.5 mol of SiH per mol of vinyl radicals in (1) and (2), and (4) a platinum catalyst.

The composition of this invention can be room temperature curing or cured by heating. When heating is employed the composition of this invention is best cured at a temperature of from 100 to 200° C., whereupon curing proceeds in one hour or less. It is believed that this curing is brought about by the reaction of the SiH containing component (3) with the vinyl groups in (1) and (2). Preferably the mixture should be used within a few hours after mixing the four ingredients, although the shelf life can be extended for days by cooling to temperatures of −20° C. or below.

The compositions of this invention are fluid materials which are readily pourable and can be used to impregnate complicated equipment. They can also be used to form cast articles of any desired shape.

For the purpose of this invention component (1) is a copolymer of two or more siloxane units. Specific examples of such copolymers are $$Me_2ViSi(O\overset{Me_2}{\overset{|}{Si}})_nOSiPh_2Vi,\quad Ph_2ViSi[(O\overset{Ph_2}{\overset{|}{Si}})_{.1}(O\overset{Me_2}{\overset{|}{Si}})_{.9}]_nOSiPh_2Vi$$

and $$MePhViSi[(O\underset{\underset{Me}{|}}{\overset{Ph}{\overset{|}{Si}}})_{.1}(O\overset{Me_2}{\overset{|}{Si}})_{.9}]_nOSiMePhVi$$

In all of the above examples $n$ is of sufficient value to produce a viscosity of 500 to 500,000 cs. at 25° C. While at least 80 mol percent of the R′ groups must be methyl, it is preferable that at least 92.5 mol percent, of the R′ groups be methyl groups. Also, while the viscosity can range up to 500,000 cs., it is generally preferable that a lower viscosity material, for example a material not exceeding about 150,000 cs., be employed since such a material is more readily pourable.

For the purpose of this invention it is essential that component (2) be employed in amount from 5 to 50% by weight of the combined weights of (1) and (2). When the compositions contain no filler, however, it is preferred that component (2) be employed in amount from 20 to 50% by weight. Composition (2) is a copolymer of the three specified siloxane units. It is essential that the weight percent of the vinyl groups in said copolymers be from 1.5 to 3.5% based on the weight of (2). These percents are calculated based on the weight of the vinyl radical, that is 27. In order to obtain transparent materials it is essential that the total trimethylsiloxane units and dimethylvinylsiloxane units relative to the $SiO_2$ units in (2) shall range from .6:1 to 1:1.

Copolymers (1) can be prepared by any of the conventional methods for preparing triorganosilyl-endblocked diorganopolysiloxanes. This can be done, for example, by cohydrolyzing and condensing the appropriate chloro- and/or alkoxylsilanes, or by equilibrating the appropriate hexaorganodisiloxane with the appropriate diorganopolysiloxane in the presence of an alkaline or acid catalyst.

Copolymers (2) can be prepared by the cohydrolysis of the silanes of the formulae $SiX_4$, $Me_3SiX$ and $Me_2ViSiX$ in the proper proportions to give the desired ratios. X is halogen or alkoxy radicals. Alternatively the copolymer can be prepared by the procedure described in U.S. Patent 2,676,182. This involves reacting a silica hydrosol with hexamethyldisiloxane or trimethylchlorosilane and with dimethylvinylchlorosilane or divinyltetramethyldisiloxane. The latter can be reacted with the silica hydrosol either simultaneously with or subsequently to reaction with the trimethylchlorosilane or hexamethyldisiloxane. Preferably the vinyl constituent is reacted with the hydrosol subsequently to the trimethylsilyl constituent.

Another critical component of the composition of this invention is copolymer (3) which must be employed in amount sufficient that the ratio of mols of silicon-bonded hydrogen in the overall composition relative to the mols of silicon-bonded vinyl groups in (1) and (2) shall be within the range .75:1 to 1.5:1. Composition (3) must be compatible with (1) and (2) if a transparent material is to be obtained. Furthermore, in order to obtain an operative material the percent by weight of silicon-bonded hydrogen in (3) must be within the range of 0.1 to 1.7 inclusive percent by weight based on the weight of (3). In order for (3) to serve as a cross-linker for the systems, there must be at least three silicon-bonded hydrogens per molecule.

Furthermore, those silicon atoms in (3) which have both hydrogen and hydrocarbon radicals bonded thereto, essentially all of these hydrocarbon radicals should be methyl. The term "essentially all" means that the presence of some PhHSiO groups is not precluded. However, if such groups are present there must also be at least three MeHSiO, $Me_2HSiO_{1/2}$ or $HSiO_{3/2}$ groups per molecule.

Specific examples of (3) of which are within the scope of this invention are $$HSi(OSiMe_2H)_2(OSiMe_3),\quad Me_3Si(O\overset{\displaystyle Me}{\underset{\displaystyle H}{Si}})_{10}OSiMe_3 \text{ and } Si(OSiMe_2H)_4$$

copolymers of $SiO_2$, $Me_2SiO$ and $Me_2HSiO_{1/2}$; copolymers of $Me_3SiO_{1/2}$, $Me_2HSiO_{1/2}$, MeHSiO and $Me_2SiO$; cyclic $(MeHSiO)_x$; copolymers of methyl hydrogen siloxane and phenylmethylsiloxane; copolymers of methyl hydrogen siloxane, dimethylsiloxane and diphenylsiloxane and copolymers of methyl hydrogen siloxane and dimethylsiloxane.

Any finely divided form of platinum can be employed as the catalyst in this invention. This includes finely dispersed metallic platinum such as platinum dispersed on charcoal or other carriers, and soluble compounds of platinum such as chloroplatinic acid, or complexes of platinic chloride with olefins such as ethylene, propylene, butadiene, cyclohexene and the like. Preferably the platinum should be in soluble form.

The amount of platinum is not critical since it merely affects the rate of cure. However, for practical operation, it is preferred that the catalyst be employed in amount ranging from .5 to 20 parts per million based on the weight of (1), (2) and (3).

After the four ingredients have been mixed in any desirable manner, the composition is then cured. The composition will cure very slowly at room temperature, but for most applications it is preferred that the mixture be heated at a temperature of from 50 to 150° C. or above. This expedites the cure so that it will proceed in a matter of from less than one hour to several hours. Thus, it can be seen that one can regulate the time of cure widely by regulating the temperature and the concentration of the platinum catalyst.

If desired, fillers may be employed in the compositions of this invention. These fillers are used when optical clarity is not desired. The fillers operative herein include any of the fillers normally employed in organopolysiloxanes such as fume silica, aluminum silicate, quartz, calcium carbonate, potassium titanate, zirconium silicate, carbon blacks, and metal oxides such as alumina, zinc oxide, titania and ferric oxide. If desired, the fillers can be treated with organosilicon compounds such as chlorosilanes or alkoxysilanes so as to produce a hydrophobic surface. The latter treatment is particularly desirable with finely divided silicas, such as fume silicas or silica aerogels.

Optionally, one can also include polydimethylsiloxane fluids in the compositions of this invention as plasticizers.

The compositions of this invention are useful for electrical insulation and for the formation of cast articles. The compositions of this invention are also useful for making light-pipes.

The following examples are illustrative only and should not be construed as limiting the invention which is properly delineated in the appended claims. The following abbreviations are employed in this specification, Me is methyl, Ph is phenyl and Vi is vinyl. In the following examples all parts and percents are by weight unless otherwise stated. In all copolymers (2) in the following examples the ratios of total $Me_3SiO_{.5}$ and $Me_2ViSiO_{.5}$ to $SiO_2$ units are in the range .6:1 to 1:1.

*Example 1*

65% of (1) a 2,000 cs. viscosity siloxane of the formula $$PhMeViSiO\left(\overset{\displaystyle Me_2}{\underset{}{SiO}}\right)_n SiPhMeVi$$

was mixed with (2) 35% of a copolymer of $SiO_2$, $Me_3SiO_{.5}$ and $Me_2ViSiO_{.5}$ containing 2.5% vinyl groups.

94.9 parts of the above mixture was mixed with (3) 5.1 parts of $PhSi(OSiMe_2H)_3$ and 5 parts per million platinum added as chloroplatinic acid dissolved in 2-ethylhexanol. The resulting mixture was cast into a slab 8 x 8 x 1/16 inch and cured one hour at 150° C. The resulting slab was clear and had the following properties:

| | |
|---|---|
| Durometer | 54 |
| Tensile strength ______ p.s.i. | 750 |
| Percent elongation at break | 80 |

The above mixture had a viscosity of 4500 cs. at 25° C. The material was cast around a steel hexagonal bar and cured one hour at 150° C. It was then subjected to thermal shock test described in Mil–I–16923C in which the specimen was cycled from 155° C. to −55° C. ten times without cracking. This proves that the material has sufficient flexibility to withstand the stress caused by difference in expansion between the siloxane and the metal inserts.

The above composition was also used to pot an electronic printed circuit. The siloxane was cured four hours at 65° C. to give a clear mass through which each component of the circuit was visible. One of the components was replaced by cutting into the cured siloxane, replacing the component and then filling the hole with more uncured siloxane. The filling material was then cured as above and the system performed in the same manner as it did prior to removal of the component. This proves the feasibility of removing one component of an insulated system without destroying the effectiveness of the insulation.

*Example 2*

A mixture of 55% of composition (1) and 45% of composition (2), both of Example 1 was made. 94.9 parts of this mixture was mixed with 5.1 parts of composition (3) of Example 1 and the catalyst of that example in amount to give 3 parts p.p.m. platinum. The resulting mixture had a viscosity of 18,000 cs. It was cast into a slab 8 x 8 x 1/16 inch and then cured one hour at 150° C. The resulting clear material had the following properties:

| | | |
|---|---|---|
| Durometer | | 55 |
| Tensile strength | p.s.i. | 840 |
| Percent elongation at break | | 100 |

*Example 3*

A fluid mixture was made containing 75% of composition (1) of Example 1, and (2) 25% of a copolymer of $SiO_2$, $Me_3SiO_{1/2}$ and $Me_2ViSiO_{1/2}$ units which copolymer contained 2.7% vinyl groups.

100 parts of this mixture was mixed with 30 parts diatomaceous earth, 5.1 parts of composition (3) of Example 1, and 3 p.p.m. of platinum. The resulting material had a viscosity of 12,000 cs. the mixture was heated one hour at 150° C. and gave the following properties:

| | | |
|---|---|---|
| Durometer | | 54 |
| Tensile strength | p.s.i. | 770 |
| Percent elongation at break | | 110 |

*Example 4*

This example shows the critical effect of the vinyl content of ingredient (2) of the claimed compositions.

In each case shown below the compositions employed were composed of 60 parts of ingredient (1) of Example 1, 40 parts by weight of each of the ingredients (2) shown in the table below 2 p.p.m. platinum and a sufficient amount of ingredient (3) of Example 1 to give in each case a SiH to vinyl ratio of 1:1. Each formulation was cast into a slab of 8 x 8 x 1/16 inch and then cured one hour at 150° C.

TABLE I

| Run No. | Percent By Wt. Vi in Resin Ingred. (2) | Durometer | Tensile, p.s.i. | Percent Elong. at Break |
|---|---|---|---|---|
| 1 | 3.5 | 61 | 590 | 70 |
| 2 | 2.95 | 56 | 790 | 80 |
| 3 | 2.70 | 50 | 930 | 110 |
| 4 | 1.70 | 35 | 600 | 190 |
| 5* | .70 | 14 | 60 | 300 |

*For comparison only.

*Example 5*

Each of the samples shown in the table below were made by mixing 65 parts of ingredient (1) of Example 1 and 35 parts of ingredient (2) of Example 1. To this mixture was added sufficient catalysts to give 2 p.p.m. platinum and sufficient of the ingredients (3) shown below to give in each case a SiH to vinyl ratio of 1.15:1. Each sample was cast into a slab 8 x 8 x 1/16 inch and then cured one hour at 150° C. The properties were as shown below:

TABLE II

| Ingredient (3) | | D | Tensile, p.s.i. | Percent Elongation at Break |
|---|---|---|---|---|
| Copolymer Formulation | Percent by Wt. SiH* | | | |
| $PhSiO_{3/2}$<br>$Me_2HSiO_{.5}$ | 0.84 | 40 | 960 | 110 |
| $HSiO_{3/2}$, $SiO_2$<br>$Me_2SiO$ and $Me_2HSiO_{.5}$ | 1.08 | 49 | 995 | 100 |
| $Me_3SiO_{.5}$<br>$MeHSiO$ | 1.35 | 52 | 580 | 75 |
| $Me_2HSiO_{.5}$<br>$MeHSiO$<br>$Me_2SiO$ | 0.57 | 46 | 1,030 | 105 |

*Determined by analysis.

*Example 6*

A tough product is obtained when a mixture of 65 parts of a 9,000 cs. fluid of the formula $$Me_2ViSi[(O\overset{Ph_2}{\overset{|}{Si}})_{.1}(O\overset{Me_2}{\overset{|}{Si}})_{.9}]_nOSiMe_2Vi$$

is mixed with 35 parts of copolymer (2) of Example 1 and 94.9 parts of this mixture is mixed with 4 parts of $Si(OSiMe_2H)_4$ and 20 p.p.m. platinum in the form of platinum dispersed on charcoal, and the resulting mixture is heated 12 hours at 50° C.

*Example 7*

A mixture was prepared which consisted of 75 parts of composition (1), 25 parts of composition (2), both of Example 1, 40 parts of Minusil (a silica having an average particle size of about 5 microns), 1 part zinc oxide and 0.5 part lampblack.

100 parts of the above mixture was mixed with 10 parts of a mixture consisting of 3.2 parts of a copolymer consisting of $Me_3SiO_{1/2}$, $Me_2HSiO_{1/2}$, $MeHSiO$ and $Me_2SiO$ units and containing .70% silicon-bonded hydrogen atoms, 5.7 parts of composition (1) of Example 1, 1.1 parts of composition (2) of Example 1, and 3 parts per million of platinum as chloroplatinic acid.

The above composition was found to be an excellent potting composition for electrical components.

That which is claimed is:

1. A composition of matter, stable for several days at −20° C., consisting essentially of (1) a polysiloxane of the formula $$R_2(CH_2{=}CH)SiO(R'_2SiO)_nSiR_2(CH{=}CH_2)$$

in which R and R′ are both selected from the group consisting of methyl and phenyl radicals, at least 80 mol percent of the R′ groups being methyl, in which siloxane (1) *n* has a value such that the viscosity of (1) is from 500 to 500,000 cs. inclusive at 25° C., (2) from 5 to 50% by weight based on the total weight of (1) and (2) of a copolymer of $SiO_2$, $(CH_3)_3SiO_{.5}$ and $(CH_3)_2CH_2{=}CHSiO_{.5}$ siloxane units in which copolymer there is from 1.5 to 3.5 inclusive percent by weight vinyl groups based on the weight of (2) and in which copolymer (2) the ratio of the total $(CH_3)_3SiO_{.5}$ and $(CH_3)_2CH_2{=}CHSiO_{.5}$ to $SiO_2$ units is from 0.6:1 to 1:1, (3) a compound compatible with (1) and (2) which is a siloxane containing from 0.1 to 1.7% by weight silicon-bonded hydrogen atoms, the remaining valences of the silicon atoms in (3) being satisfied by radicals selected from the group consisting of phenyl and methyl radicals, there being at least three silicon-bonded hydrogen atoms per molecule and in (3) any hydrocarbon radicals attached to SiH silicon are essentially all methyl radicals, the amount of (3) being such that there is from .75 mol of SiH per mol of vinyl radicals in (1) and (2) to 1.5 mols of SiH per mol of vinyl radicals in (1) and (2), and (4) a platinum catalyst.

2. The composition of claim 1 which also contains at least one filler.

3. The composition of claim 1 wherein at least 92.5 mol percent of the R′ groups in (1) are methyl groups and the amount of (2) ranges from 20 to 50%.

4. The composition of claim 3 which also contains at least one filler.

5. The composition of claim 1 wherein the polysiloxane (1) has the formula $$(C_6H_5)(CH_3)CH_2{=}CHSiO[(CH_3)_2SiO]_nSiCH{=}CH_2(CH_3)(C_6H_5)$$

$n$ has a value such that the viscosity of (1) is from 500 to 150,000 cs. inclusive at 25° C. and the amount of (2) ranges from 20 to 50%.

6. The composition of claim 5 which also contains at least one filler.

7. A method which comprises mixing (1) a polysiloxane of the formula $$R_2(CH_2{=}CH)SiO(R'_2SiO)_nSiR_2(CH{=}CH_2)$$

in which R and R′ are both selected from the group consisting of methyl and phenyl radicals, at least 80 mol percent of the R′ groups being methyl, in which siloxane (1) $n$ has a value such that the viscosity of (1) is from 500 to 500,000 cs. inclusive at 25° C., (2) from 5 to 50% by weight based on the total weight of (1) and (2) of a copolymer of $SiO_2$, $(CH_3)_3SiO_{.5}$ and $(CH_3)_2CH_2{=}CHSiO_{.5}$ siloxane units in which copolymer there is from 1.5 to 3.5 inclusive percent by weight vinyl groups based on the weight of (2) and in which copolymer (2) the ratio of the total $(CH_3)_3SiO_{.5}$ and $(CH_3)_2CH_2{=}CHSiO_{.5}$ to $SiO_2$ units is from 0.6:1 to 1:1, (3) a compound compatible with (1) and (2) which is a siloxane containing from 0.1 to 1.7% by weight silicon-bonded hydrogen atoms, the remaining valences of the silicon atoms in (3) being satisfied by radicals selected from the group consisting of phenyl and methyl radicals, there being at least three silicon-bonded hydrogen atoms per molecule and in (3) any hydrocarbon radicals attached to SiH silicon being essentially all methyl radicals, the amount of (3) being such that there is from .75 mol of SiH per mol of vinyl radicals in (1) and (2) to 1.5 mols of SiH per mol of vinyl radicals in (1) and (2), and (4) a platinum catalyst, and thereafter curing the mixture.

8. A cured siloxane composition prepared in accordance with the method of claim 7.

9. The method of claim 7 wherein at least one filler is mixed in with the other ingredients prior to curing.

10. A cured siloxane composition prepared in accordance with the method of claim 9.

11. The method of claim 7 wherein at least 92.5 mol percent of the R′ groups in (1) are methyl groups.

12. The method of claim 11 wherein at least one filler is mixed in with the other ingredients prior to curing.

13. The method of claim 7 wherein the polysiloxane (1) has the formula $$(C_6H_5)(CH_3)CH_2{=}CHSiO[(CH_3)_2SiO]_nSiCH{=}CH_2(CH_3)(C_6H_5)$$

$n$ has a value such that the viscosity of (1) is from 500 to 150,000 cs. inclusive at 25° C. and the amount of (2) ranges from 20 to 50%.

14. The method of claim 13 wherein at least one filler is mixed in with the other ingredients prior to curing.

References Cited by the Examiner

UNITED STATES PATENTS 2,915,497 12/1959 Clark ............ 260—46.5

References Cited by the Applicant

UNITED STATES PATENTS 2,728,692 12/1955 Dennett.
2,894,930 7/1959 Clark.
2,999,078 9/1961 Delphenich.

LEON J. BERCOVITZ, *Primary Examiner.*

M. I. MARQUIS, *Assistant Examiner.*